(12) United States Patent
Fahraeus

(10) Patent No.: US 7,295,193 B2
(45) Date of Patent: Nov. 13, 2007

(54) WRITTEN COMMAND

(75) Inventor: Christer Fahraeus, Lund (SE)

(73) Assignee: Anoto AB, Lund (SE)

( * ) Notice: Subject to any disclaimer, the term of this patent is extended or adjusted under 35 U.S.C. 154(b) by 1303 days.

(21) Appl. No.: 09/746,782

(22) Filed: Dec. 22, 2000

(65) Prior Publication Data

US 2001/0024193 A1    Sep. 27, 2001

Related U.S. Application Data

(60) Provisional application No. 60/177,307, filed on Jan. 21, 2000.

(30) Foreign Application Priority Data

Dec. 23, 1999    (SE) .................................. 9904744

(51) Int. Cl.
   *G06F 3/033*    (2006.01)
(52) U.S. Cl. .................. 345/179; 345/173; 178/18.01; 382/189
(58) Field of Classification Search ........ 345/173–179, 345/901, 19.01, 19.03; 379/142, 52; 178/19.01, 178/19.03, 18.01, 18.03, 18.04; 382/187, 382/189, 311
   See application file for complete search history.

(56) References Cited

U.S. PATENT DOCUMENTS

| | | | | |
|---|---|---|---|---|
| 4,924,496 A | * | 5/1990 | Figa et al. .................. | 379/142 |
| 5,231,698 A | * | 7/1993 | Forcier ....................... | 715/541 |
| 5,434,371 A | | 7/1995 | Brooks | |
| 5,513,278 A | * | 4/1996 | Hashizume et al. ........ | 382/187 |
| 5,541,988 A | * | 7/1996 | Draganoff ................... | 379/354 |
| 5,581,593 A | * | 12/1996 | Engelke et al. .............. | 379/52 |
| 5,652,412 A | * | 7/1997 | Lazzouni et al. ......... | 178/18.01 |
| 5,673,337 A | * | 9/1997 | Gallo et al. ................. | 382/187 |
| 5,710,831 A | * | 1/1998 | Beernink et al. ........... | 382/189 |
| 5,727,081 A | * | 3/1998 | Burges et al. .............. | 382/229 |
| 5,757,962 A | * | 5/1998 | Gallo et al. ................. | 382/204 |
| 5,852,434 A | | 12/1998 | Sekendur | |
| 5,889,888 A | * | 3/1999 | Marianetti et al. .......... | 382/187 |
| 6,104,387 A | * | 8/2000 | Chery et al. ................ | 345/179 |

(Continued)

FOREIGN PATENT DOCUMENTS

EP    0439340    7/1991

(Continued)

OTHER PUBLICATIONS

Webpage entitled: "Sänd fax, e-post och SMS direkt från din C-Pen" http://www.cpen.com/news.pressrelease/99923bsv.shtml, Sep. 23, 1999.

(Continued)

*Primary Examiner*—Richard Hjerpe
*Assistant Examiner*—Kimnhung Nguyen
(74) *Attorney, Agent, or Firm*—Birch, Stewart, Kolasch & Birch, LLP

(57) ABSTRACT

A handheld electronic device which is adapted to carry out at least one operation. The device is controllable by a user using the device as a pen and writing a command for initiating said operation, such as "dial the following telephone number".

A method for initiating the operation in an electronic device and software used for implementing the method.

36 Claims, 4 Drawing Sheets

U.S. PATENT DOCUMENTS

| | | | |
|---|---|---|---|
| 6,201,903 B1 * | 3/2001 | Wolff et al. | 382/317 |
| 6,570,104 B1 * | 5/2003 | Ericson et al. | 178/18.09 |
| 6,628,847 B1 | 9/2003 | Kasabach et al. | |

FOREIGN PATENT DOCUMENTS

| | | |
|---|---|---|
| EP | 0615209 | 9/1994 |
| JP | 10-257309 | 9/1998 |
| WO | WO9820446 | 5/1998 |
| WO | WO9946909 | 9/1999 |
| WO | WO9948268 | 9/1999 |
| WO | WO 99/50787 | 10/1999 |
| WO | WO9960467 | 11/1999 |
| WO | WO0000928 | 1/2000 |
| WO | WO0025293 | 5/2000 |
| WO | WO0073983 | 12/2000 |
| WO | WO0126032 | 4/2001 |
| WO | WO0126033 | 4/2001 |
| WO | WO0126034 | 4/2001 |

OTHER PUBLICATIONS

Webpage entitled: "The Optical Translation Measurement" http://www.goulite.com/btn01main.html, Mar. 20, 2001.

* cited by examiner

WRITTEN COMMAND

CROSS REFERENCE TO RELATED APPLICATION

This application claims the benefit of U.S. Provisional Application No. 60/177,307, filed Jan. 21, 2000.

FIELD OF THE INVENTION

The present invention relates to a handheld electronic device which is adapted to carry out at least one operation. The invention also relates to a method for initiating an operation in a handheld electronic device, as well as a computer program.

BACKGROUND ART

Handheld computers and other handheld electronic devices, such as mobile telephones, PDAs, reading pens, and scanners, are usually controlled by means of one or several buttons or keys, with the aid of which a user issues various commands to the device or inputs information which the device is to use. If there are only a few buttons, controlling the device is usually complicated and time-consuming. On the other hand, if there are many buttons/keys they are usually small in order to only require a small amount of space on the handheld device, which makes them inconvenient to use and increases the risk of pressing the wrong button/key.

U.S. Pat. No. 5,852,434 discloses a device which enables a user to input hand-written and hand-drawn information to a computer while the information is being written/drawn on the writing surface. The device comprises a writing surface, on which a position code is arranged for coding X/Y coordinates of positions on the surface, and a special pen with a writing tip by means of which the user can write or draw on the writing surface. Furthermore, the pen has a light source for illuminating the position code and a CCD sensor for forming an image of the position code. The positional information received by the CCD sensor is transferred to a computer for processing.

WO 99/48268 discloses a handheld device for writing a telephone number and sending the number to a mobile telephone for automatic dialing.

SUMMARY OF THE INVENTION

An object of the present invention is to simplify the control and operation of a handheld device.

This object is completely or partly achieved by a device according to claim 1, a computer program according to claim 16, and a method according to claim 17 or 18. Preferred embodiments are defined in the subclaims.

According to a first aspect, the invention relates to a handheld electronic device adapted to carry out at least one operation, the device being controllable by a user using the device as a pen and writing a command for initiating said operation.

An advantage of the invention is thus that the user is not required to press any keys or buttons on the device. Instead, he controls the device by writing a command for the operation he wishes to carry out. This makes the device more convenient to use for the user.

The command written by the user can, for example, be a word indicating the operation which is to be carried out, for example "Dial" if the user wants the device to dial a certain number. It can also be a symbol, a character, a number, or a figure indicating the operation which is to be carried out.

The device can record the command written by means of the device in different ways, for example by using one or more sensors which detect the movement of the device.

However, in a preferred embodiment, the device is adapted to record the command by detecting a position code located on a writing surface upon which the command is written.

This embodiment is advantageous since it makes it possible to determine the absolute position of the device on the writing surface, which enables an exact recording of the written command. More specifically, the position code can be detected continuously while the command is being written, a sequence of position indications being obtained which define how the device has been moved and thus which command has been written.

The device can use different types of sensors depending on the technology used to implement the position code. In a preferred embodiment, the position code is designed in such a way that it can be detected by an optical sensor. In this case, the device advantageously comprises an optical sensor which is adapted to record images of the writing surface, and a signal processor which is adapted to use the position code in the images for providing a digital representation of the command.

This embodiment is advantageous because it is based on image processing, which is a well-known and well-developed technology.

The signal processor may comprise an interpretation function for recognizing a command symbol. Thus, the user may define an arbitrary symbol as a command symbol and when writing this symbol, the device interprets the symbol as a command.

One example would be the character @, which may be interpreted as a command that the following characters are to be interpreted as an e-mail address. By writing the command symbol @ once again, after the e-mail address (thus for the third time), it is interpreted as the end of the input of the e-mail address.

Moreover, the signal processor may comprise a character interpretation function which is adapted to translate the digital representation of the command into character-coded format. This embodiment is advantageous because it makes it easier to determine which command the user has written and available software for character recognition may be used for interpretation of the command. The character interpretation operation can, for example, be carried out by ICR software.

Furthermore, the device can be adapted to record a message information quantity which is used in the operation and recorded in essentially the same way as the command. In this way, the user will have the same interface for controlling the device and for inputting message information. The device will be less expensive to produce if the same means are used for inputting message information.

The message information quantity can, for example, be a text which is to be transmitted in an e-mail message, a telephone number which is to be dialed, an entry which is to be made in a calendar program or some other similar information quantity. It can comprise text, numbers, various types of characters, symbols, figures, drawings, and other information which can be generated by means of "handwriting", which is defined as any manual movement of the device on a surface.

In a preferred embodiment, the message information quantity is also recorded by detecting the position code on the writing surface.

The device can have at least two modes, one being a command mode for recording the command and the other being an information mode for recording the information quantity. By virtue of the fact that it has different modes the device knows how the data that is written by means of the device should be processed and there is no doubt about whether the data is a command or a message information quantity.

In one embodiment, the device assumes the command mode when a predetermined command symbol is written with the aid of the device. This command symbol can be a figure, one or several characters, a picture or the like.

In another embodiment, the device assumes the command mode when it detects that the writing surface has a special design. The writing surface can, for example, have a special area for writing commands and another area for writing the information quantity, the device detecting on which area it is located with the aid of the position code.

The principle according to the invention can be used for causing a handheld electronic device to carry out any operation which can be initiated by means of a command. Examples of operations that are carried out in handheld electronic devices include dialing, faxing, sending an electronic message, saving information, managing documents and files, and starting, controlling and closing programs. An operation may or may not be an operation which utilizes a message information quantity.

In an advantageous embodiment the device is a mobile telephone, which can thus be controlled by a user using the telephone as a pen, for example writing "dial 1234567", whereupon the telephone automatically dials that number.

In an alternative embodiment the device comprises an accelerometer for recording the command. The accelerometer records the movement of the device when the command is being written. This embodiment has the advantage that the command can be written on any surface or even in the air, without contact with a surface. Accordingly, there is no need for a writing surface with a position code and, in fact, there is no need for a writing surface at all; rather, the command can be "written" on any arbitrary surface.

In yet another alternative embodiment, the device comprises an optical sensor for recording images with partially overlapping content and a signal processor which is adapted to determine how the device has been moved in connection with the writing of the command by determining the relative position of the images.

This embodiment also has the advantage that no position code is required; rather, the user can "write" the command with the aid of the device on any surface which is sufficiently patterned to enable the determination of the relative position of the images. The technology for determining what has been written is described in more detail in publication WO 99/60467, the contents of which is incorporated in the present specification by reference. This method for recording a command can advantageously be used for controlling a reading pen or a handheld scanner of the type described in the publication WO 98/20446, the contents of which is incorporated in the present specification by reference, and sold under the trademark C-Pen®.

The device need not be one integrated unit. In one embodiment, the device can have a first and a second part which are separable and which have transceivers for mutual wireless or wirebound communication, the device being controllable by the user using the first part as said pen, by means of which said command for initiating the operation is written.

According to a second aspect of the present invention, it relates to a computer program, which is stored on a memory medium, which can be read by a computer, and which comprises instructions for causing the computer to detect a command written by means of a handheld electronic device which is being used as a pen and initiate a predetermined operation in response to the command. The advantages of this software are evident from the above discussion. The software is designed to be installed in the device by means of which the command is written.

According to a third aspect of the present invention, it relates to a method for initiating an operation in a handheld electronic device comprising the steps of using the device itself as a pen and writing a command for carrying out said operation.

The advantages of the method are evident from the above discussion.

BRIEF DESCRIPTION OF THE DRAWINGS

The invention will be described in more detail below with reference to the accompanying drawings, in which.

DETAILED DESCRIPTION OF EMBODIMENTS OF THE INVENTION

Figure 1:
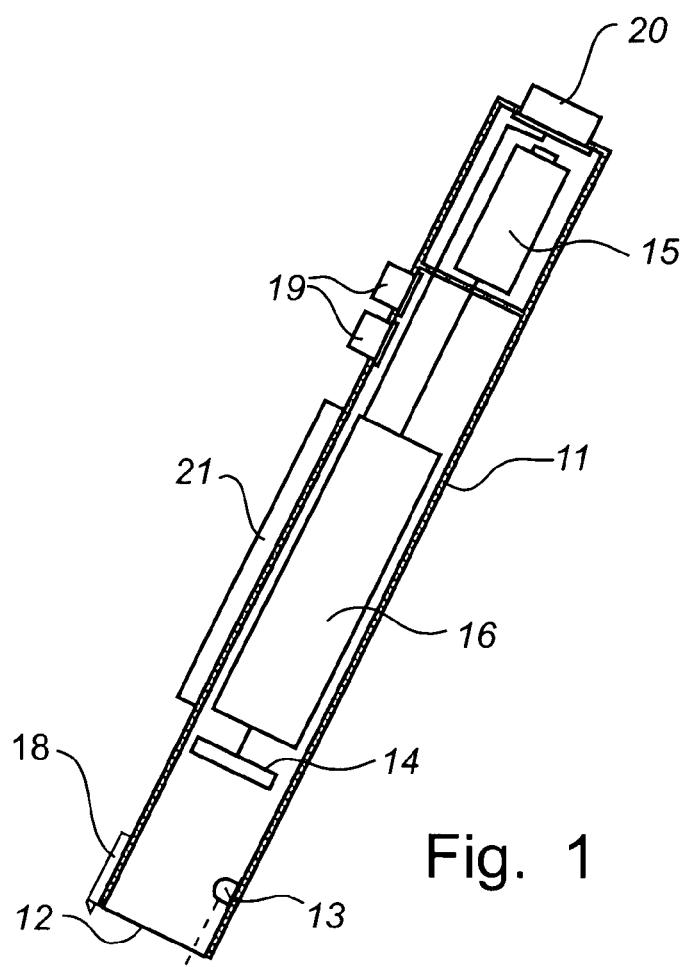
FIG. 1 is a partial, schematic cross-sectional view of an embodiment of a handheld device according to the invention.

FIG. 1 discloses a handheld device in the form of a digital pen, which can be used for writing text and drawing lines and pattern or symbols which are to be recorded in digital format. The device is controlled by the user by writing commands with the pen for the operations which are to be carried out.

The device comprises a casing 11 having approximately the same shape as a pen. At one short side of the casing there is an opening 12 or a window which is transparent for IR light. The short side is intended to abut against or be placed a short distance from a writing surface 3 during operation of the device, see FIG. 2.

The casing 11 essentially comprises an optics part, an electronic circuitry part, and a power supply. The optics part comprises at least one light-emitting diode 13 for illuminating the surface which is to be imaged and a light-sensitive area sensor 14, such as a CCD or CMOS sensor, for recording a two-dimensional image. The user unit may also comprise a lens system (not shown).

The power supply to the device is obtained from a battery 15, which is mounted in a separate compartment in the casing 11. The battery may be a chargable battery.

Alternatively, the power supply is obtained via a cable connection with a separate device, comprising a power source.

The electronic circuitry part comprises a signal processor 16. The signal processor 16 is implemented with the aid of a microprocessor and a memory and contains software for analyzing images from the sensor for providing a digital representation of what is being written on the writing surface 3. Furthermore, it contains operation software for initiating and/or carrying out various operations in response to commands, as well as user software. Moreover, the signal processor 16 advantageously contains ICR software which can be used for interpreting the recorded characters so that they can be stored, manipulated, and/or forwarded in character-coded format.

The casing 11 of the device also comprises a pen point 18, with the aid of which the user can write ordinary pigment-based writing on the writing surface 3. The pen point 18 is extendable and retractable so that the user can control whether or not it is to be used. The pigment is preferably non-absorbing for IR light.

Moreover, the device comprises buttons 19 by means of which the device can be activated and controlled for operations which are not initiated by commands written by means of the device. The buttons 19 can also be used for causing the device to assume different modes, as well as an on/off switch.

It may also comprises a transceiver 20 for wireless transfer, for example by means of IR light, ultrasound or radio waves, of information over short distances. This wireless transfer can be utilized when the device cannot itself carry out the whole initiated operation and needs to forward the recorded information quantity and information about the operation to be carried out to an external unit.

Finally, the device may comprise a display 21 for showing information.

The above-mentioned publication WO 98/20446 discloses a device for scanning and recording text. If programmed in a suitable way, this device can be utilized for recording text and commands which are being written on a writing surface provided with a position code, and for initiating/carrying out operations in response to the written commands.

Figure 2:
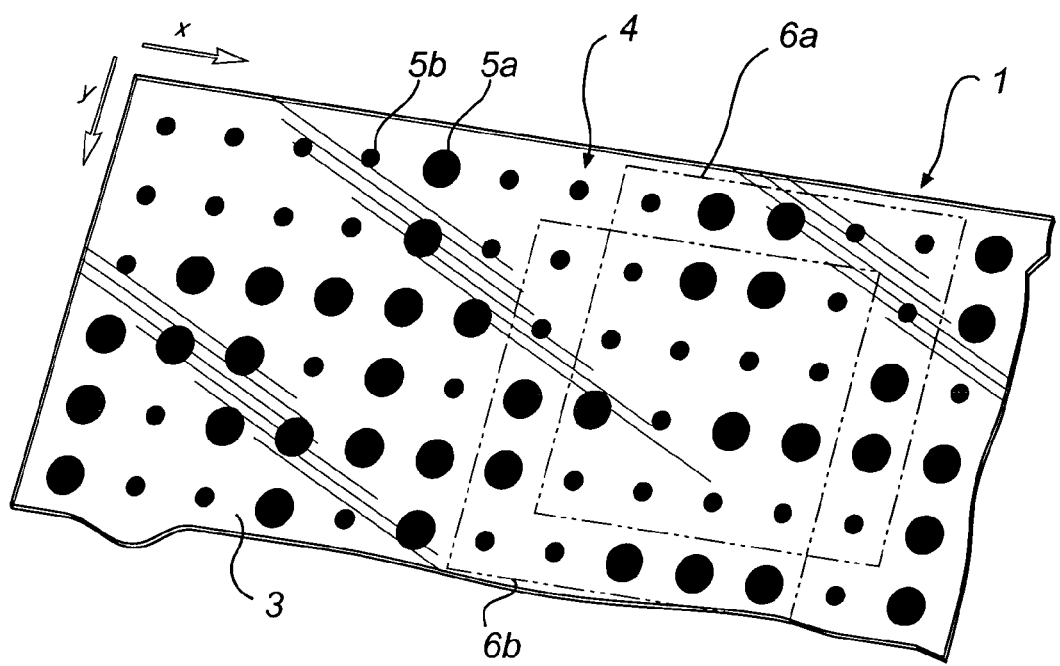
FIG. 2 is a plan view of a writing surface provided with a position code and which can be used for recording written commands.

FIG. 2 shows a sheet of paper 1 defining a writing surface 3. On the writing surface 3 there is printed a position code 4, which is composed of symbols 5 of a first and a second type 5a, 5b and more specifically a dot having a larger radius and a dot having a smaller radius, corresponding to a "one" and a "zero" respectively. For the sake of clarity, the symbols 5 have been enlarged and the position code 4 is only shown on a small part of the writing surface 3. In a real embodiment the position code extends across the entire writing surface 3 and the symbols 5 are smaller to ensure better position resolution.

The position code 4 can be created in a number of different ways. One way of creating a position code 4 in which each position is coded with one symbol 5 is described in U.S. Pat. No. 5,852,434. However, in the present invention, each position is advantageously coded with the aid of a plurality of symbols 5 and the coding is such that each symbol 5 in the position code 4 contributes to the coding of more than one position, so called floating coding. This means that two adjoining positions share some symbols 5, as indicated in FIG. 1 by the dashed areas 6a, 6b. In this way, a higher resolution is achieved and the detection becomes easier since the individual symbols 5 can be less complex.

This type of overlapping or floating position code 4 can be created with the aid of a computer.

A special way of generating such a floating position code is described in the publication WO 00/73983, the contents of which is incorporated in the present specification by reference, and patent applications Nos. PCT/SE00/001895, PCT/SE00/001897 and PCT/SE00/001898 all filed Oct. 2, 2000, the contents of which are incorporated in the present specification by reference.

The operation of the device in FIG. 1 will now be described.

Suppose that a user wishes to make an entry in a calendar program in the device. In this case, he must first open the calendar program. In order to cause the device to carry out this task, the user first writes a special command symbol and subsequently the command letters "calendar" on the sheet of paper 3 using the pen point 17. The command symbol may be any symbol that the user has defined to be a command symbol, for example a large circle like "O" inside which is written a small circle like "o", more or less in one pen stroke, like the following:

While the user is writing, the optical sensor 14 continuously captures images of the writing surface 3 in the current position of the device. Each image contains a part of the position code 4. The signal processor 16 localizes the position code 4 in each image and, on the basis of this code, determines the coordinates of the absolute position on the writing surface 3 in which each image was captured. In this way, a description, in the form of a large number of position indications, is obtained of how the pen has been moved across the sheet. This description constitutes a digital representation of the command symbol and the command. The position indications are fed as an input signal to the ICR software, which determines the characters to which the positions correspond, so that the command symbol and the command can be translated into character-coded format. The command may be ended by once again entering the command symbol.

When the processor detects the command symbol it knows that the characters that follow should be interpreted as a written command. The processor then compares the characters representing the recorded command with a number of predetermined commands to determine which command the user has written. When it has determined that the command is a command for opening the calendar program, it carries out the operation of opening the calendar program. The program can, for example, show a day in the calendar on the display 21 in the usual way.

The user moves a cursor to the time where the entry should be made. Subsequently, the user writes the entry he wishes to make on the sheet of paper 3 using the pen point 17. The device records the entry in the same way as the command. Since the processor does not detect the command symbol it knows that the written characters represent an information quantity. The characters are translated into character-coded format with the aid of the ICR software and are stored in the calendar program.

Next, the user wishes to save and close the program. To this end, she writes the command symbol followed by the command "save". The written command is processed in the same way as the command "open" and results in the execution of the operation of saving the written entry.

After the execution of a command, the device reverts to its normal input mode, until the next command symbol is entered.

It should be noted that the pen point 17 is only used in order to make it easier for the user to see what he is writing. It has no other function.

Figure 3:
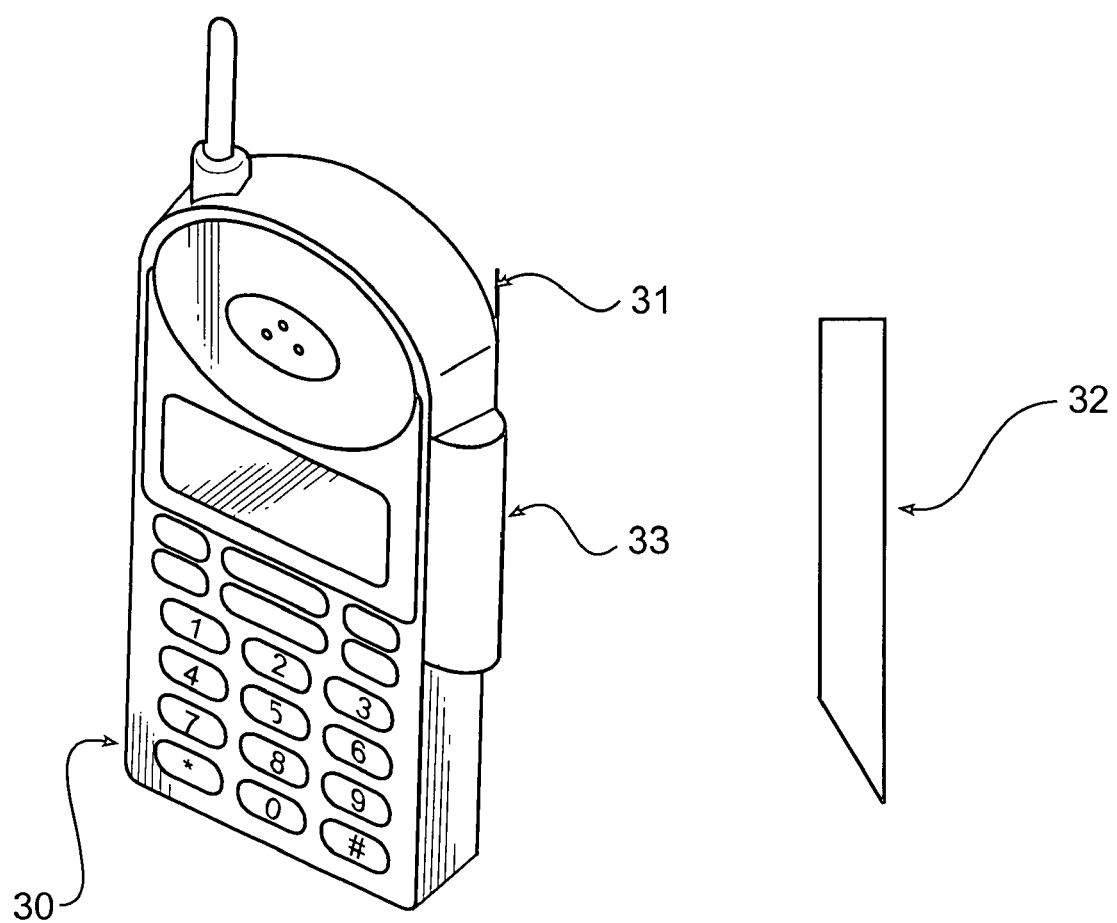
FIG. 3 is an isometric view of a second embodiment of a handheld device according to the invention.

FIG. 3 schematically shows another embodiment of a device according to the invention. In this example, the device is an ordinary mobile telephone 30 supplemented with new software, a transceiver 31 for wireless communication over short distances, and a pen 32 for controlling the telephone. When the pen is not in use it is placed in a holder 33 on the side of the telephone. The holder may comprise a contact for connecting the pen to the battery of the mobile telephone for charging the pen battery. Alternatively, the pen battery may be charged at the same time as the telephone battery is charged by a battery charger. The charging circuitry of the telephone may be used for controlling the battery charge of the pen as well.

The holder may further comprise connectors for connecting the pen to the electronic circuitry of the telephone, so that the pen may download its memory contents to the telephone, or transmit its memory contents to a network using the telephone as a modem.

The structure of the pen 32 is essentially the same as that of the device in FIG. 1. However, it has no display, no mobile telephone transceiver, and only part of the software in the device in FIG. 1.

When the user wishes to telephone, for example, she detaches the pen and writes "dial" using the pen on a sheet of paper with a position code. She circles the word "dial" to indicate that it is a command. Subsequently, she writes the telephone number that is to be dialed. The pen records images of the position code on the sheet and transfers these images by the intermediary of a transmitter 34 for wireless communication over short distances to the transceiver 31 in the mobile telephone. The images received are processed in the mobile telephone in the same way as described above with reference to FIG. 1, the result being that the mobile telephone carries out the operation of dialing the number indicated.

Alternatively, the optical sensor in the pen 32 can be integrated with the mobile telephone and the whole mobile telephone can be used as a pen for writing commands.

Another alternative is that the pen performs all actions and operations, and when the telephone number is recognised and decoded to ASCII, the pen sends the telephone number to the telephone for initiating the call, or transmits the telephone number to the telephone via the above-mentioned connectors.

As an alternative to the above embodiment in which the command is indicated by means of a special character or figure, the devices can be switched between a command mode and an information mode with the aid of the buttons 19.

In cases where the number of possible commands is small, there is no need to specially indicate the commands.

As mentioned above, the detection of the written command can be based on other techniques than the detection of a position code, such as an accelerometer or the recording of images with partially overlapping content for determining the movement of the device. These embodiments are not described in detail since the person skilled in the art will have no difficulty modifying the above device for the use of alternative techniques.

Finally, the preferred embodiment of the absolute position-coding pattern will now be described. For the sake of simplicity it is described in connection with a sheet of paper. It corresponds to the absolute position-coding pattern described in PCT/SE00/01895. It is referred to as a position-coding pattern since a surface to which the position code is applied gives a slightly patterned impression.

Figure 4:
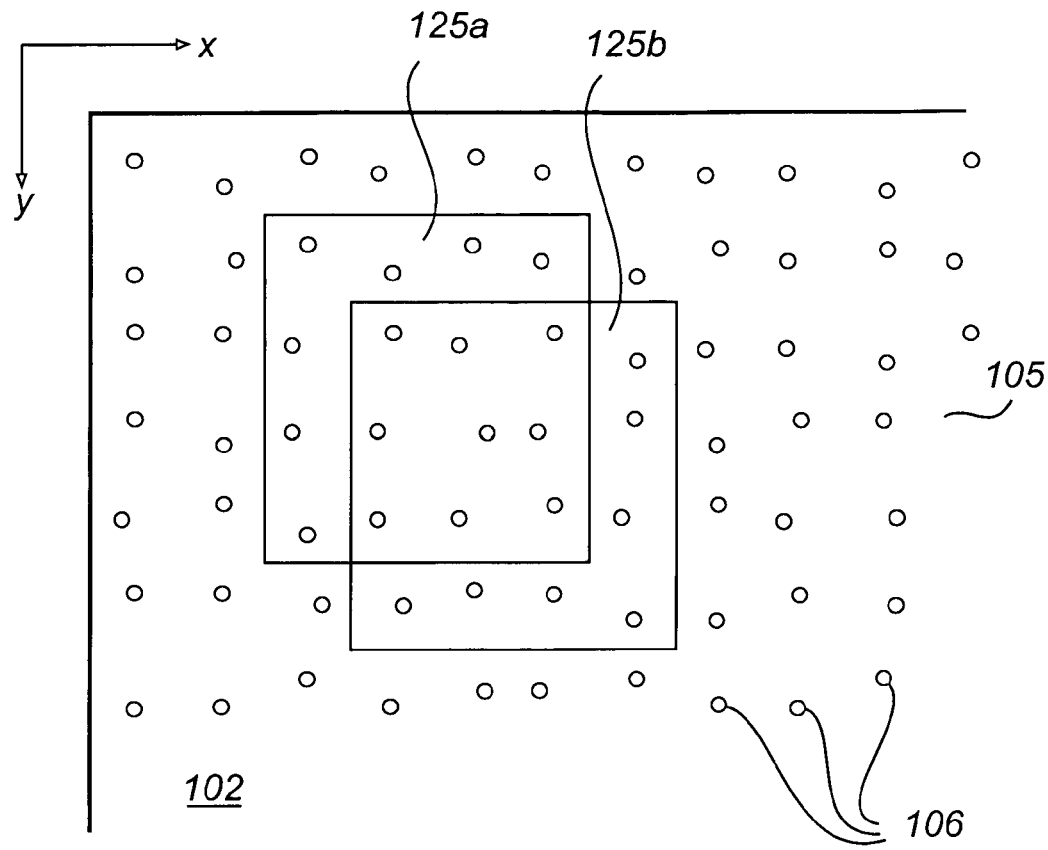
FIG. 4 is a schematic diagram of a product provided with an alternative position coding pattern.
Figure 5:
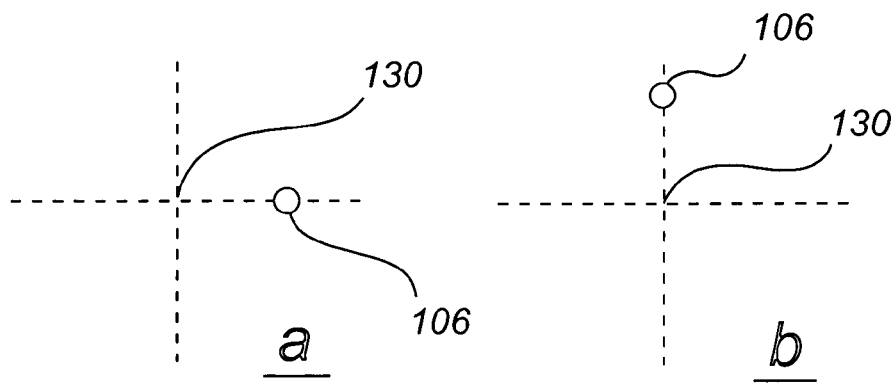
FIG. 5 is a schematic diagram disclosing how the markings may be designed and positioned in the position code pattern of FIG. 4.
Figure 5:
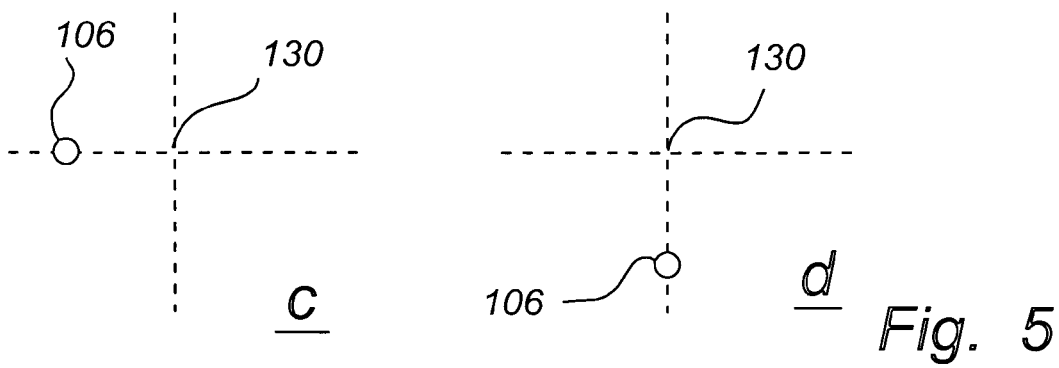

FIG. 4 shows an enlarged part of a sheet which on its surface 102 is provided with the position-coding pattern 105. The sheet has an x coordinate axis and a y coordinate axis.

The position-coding pattern comprises a virtual raster which neither is visible to the human eye nor can be detected directly by a device which is to determine positions on the surface, and a plurality of symbols which each can assume one of four values "1"-"4" as will be described below.

The position-coding pattern is arranged in such a manner that the symbols on a partial surface of the sheet of paper code absolute coordinates of a point on an imaginary surface, which will be described below. A first and a second partial surface 125a, 125b are indicated by dashed lines in FIG. 4. That part of the position-coding pattern (in this case 4×4 symbols) which is to be found on the first partial surface 125a codes the coordinates of a first point, and that part of the position-coding pattern which is to be found on the second partial surface 125b codes the coordinates of a second point on the imaginary surface. Thus the position-coding pattern is partially shared by the adjoining first and second points. Such a position-coding pattern is in this application referred to as "floating".

FIGS. 5a-5d show an embodiment of a symbol which can be used in the position-coding pattern. The symbol comprises a virtual raster point 130 which is represented by the intersection between the raster lines, and a marking 106 which has the form of a dot. The value of the symbol depends on where the marking is located. In the Example in FIG. 5, there are four possible locations, one on each of the raster lines extending from the raster points. The displacement from the raster point is equal to all values. In the following, the symbol in FIG. 5a has the value 1, in FIG. 5b the value 2, in FIG. 5c the value 3 and in FIG. 5d the value 4. Expressed in other words, there are four different types of symbols.

It should be pointed out that the dots can, of course, have a different shape.

Each symbol can thus represent four values "1-4". This means that the position-coding pattern can be divided into a first position code for the x coordinate, and a second position code for the y coordinate. The division is effected as follows:

| Symbol value | x-code | y-code |
|---|---|---|
| 1 | 1 | 1 |
| 2 | 0 | 1 |
| 3 | 1 | 0 |
| 4 | 0 | 0 |

Thus, the value of each symbol is translated into a first digit, in this case bit, for the x-code and a second digit, in this case bit, for the y-code. In this manner, two completely independent bit patterns are obtained. The patterns can be combined to a joint pattern, which is coded graphically by means of a plurality of symbols according to FIG. 5.

The coordinates for each point is coded by means of a plurality of symbols. In this example, use is made of 4×4 symbols to code a position in two dimensions, i.e. an x-coordinate and a y-coordinate.

The position code is made up by means of a number series of ones and zeros which have the characteristic that no sequence of four bits appears more than once in the series. The number series is cyclic, which means that the characteristic also applies when one connects the end of the series to the beginning of the series. Thus a four-bit sequence always has an unambiguously determined position in the number series.

The series can maximally be 16 bits long if it is to have the above-described characteristic for sequences of four bits. In this example, use is, however, made of a series having a length of seven bits only as follows:

"0 0 0 1 0 1 0".

This series contains seven unique sequences of four bits which code a position in the series as follows:

| Position in the series | Sequence |
|---|---|
| 0 | 0001 |
| 1 | 0010 |
| 2 | 0101 |
| 3 | 1010 |
| 4 | 0100 |
| 5 | 1000 |
| 6 | 0000 |

For coding the x-coordinate, the number series is written sequentially in columns across the entire surface that is to be coded. The coding is based on the difference or position displacement between numbers in adjoining columns. The size of the difference is determined by the position (i.e. with which sequence) in the number series, in which one lets the column begin. More specifically, if one takes the difference modulo seven between on the one hand a number which is coded by a four-bit sequence in a first column and which thus can have the value (position) 0-6, and, on the other hand, the corresponding number (i.e. the sequence on the same "level") in an adjoining column, the result will be the same independently of where along the two columns one makes the comparison. By means of the difference between two columns, it is thus possible to code an x-coordinate which is constant for all y-coordinates.

Since each position on the surface is coded with 4×4 symbols in this example, three differences (having the value 0-6) as stated above are available to code the x-coordinate. Then the coding is carried out in such manner that of the three differences, one will always have the value 1 or 2 and the other two will have values in the range 3-6. Consequently no differences are allowed to be zero in the x-code. In other words, the x-code is structured so that the differences will be as follows: (3-6) (3-6) (1-2) (3-6) (3-6) (1-2) (3-6) (3-6) (1-2) . . .

Each x-coordinate thus is coded with two numbers between 3 and 6 and a subsequent number which is 1 or 2. If three is subtracted from the high numbers and one from the low, a number in mixed base will be obtained, which directly yields a position in the x-direction, from which the x-coordinate can then be determined directly, as shown in the example below.

By means of the above described principle, it is thus possible to code x-coordinates 0, 1, 2 . . . , with the aid of numbers representing three differences. These differences are coded with a bit pattern which is based on the number series above. The bit pattern can finally be coded graphically by means of the symbols in FIG. 5.

In many cases, when reading 4×4 symbols, it will not be possible to produce a complete number which codes the x-coordinate, but parts of two numbers. Since the least significant part of the numbers is always 1 or 2, a complete number, however, can easily be reconstructed.

The y-coordinates are coded according to the same principle as used for the x-coordinates. The cyclic number series is repeatedly written in horizontal rows across the surface which is to be position-coded. Just like in the case of the x-coordinates, the rows are allowed to begin in different positions, i.e. with different sequences, in the number series. However, for y-coordinates one does not use differences but codes the coordinates with numbers that are based on the starting position of the number series on each row. When the x-coordinate for 4×4 symbols has been determined, it is in fact possible to determine the starting positions in the number series for the rows that are included in the y-code in the 4×4 symbols. In the y-code the most significant digit is determined by letting this be the only one that has a value in a specific range. In this example, one lets one row of four begin in the position 0-1 in the number series to indicate that this row relates to the least significant digit in a y-coordinate, and the other three begin in the position 2-6. In y-direction, there is thus a series of numbers as follows: (2-6) (2-6) (2-6) (0-1) (2-6) (2-6) (2-6) (0-1) (2-6) . . .

Each y-coordinate thus is coded with three numbers between 2 and 6 and a subsequent number between 0 and 1.

If 0 is subtracted from the low number and 2 from the high, one obtains in the same manner as for the x-direction a position in the y-direction in mixed base from which it is possible to directly determine the y-coordinate.

With the above method it is possible to code 4×4×2=32 positions in x-direction. Each such position corresponds to three differences, which gives 3×32=96 positions. Moreover, it is possible to code 5×5×5×2=250 positions in y-direction. Each such position corresponds to 4 rows, which gives 4×250=1000 positions. Altogether it is thus possible to code 96000 positions. Since the x-coding is based on differences, it is, however, possible to select in which position the first number series begins. If one takes into consideration that this first number series can begin in seven different positions, it is possible to code 7×96000=672000 positions. The starting position of the first number series in the first column can be calculated when the x-coordinate has been determined. The above-mentioned seven different starting positions for the first series may code different sheets of paper or writing surfaces on a product.

With a view to further illustrating the function of the position-coding pattern, here follows a specific example which is based on the described embodiment of the position code.

Figure 6:
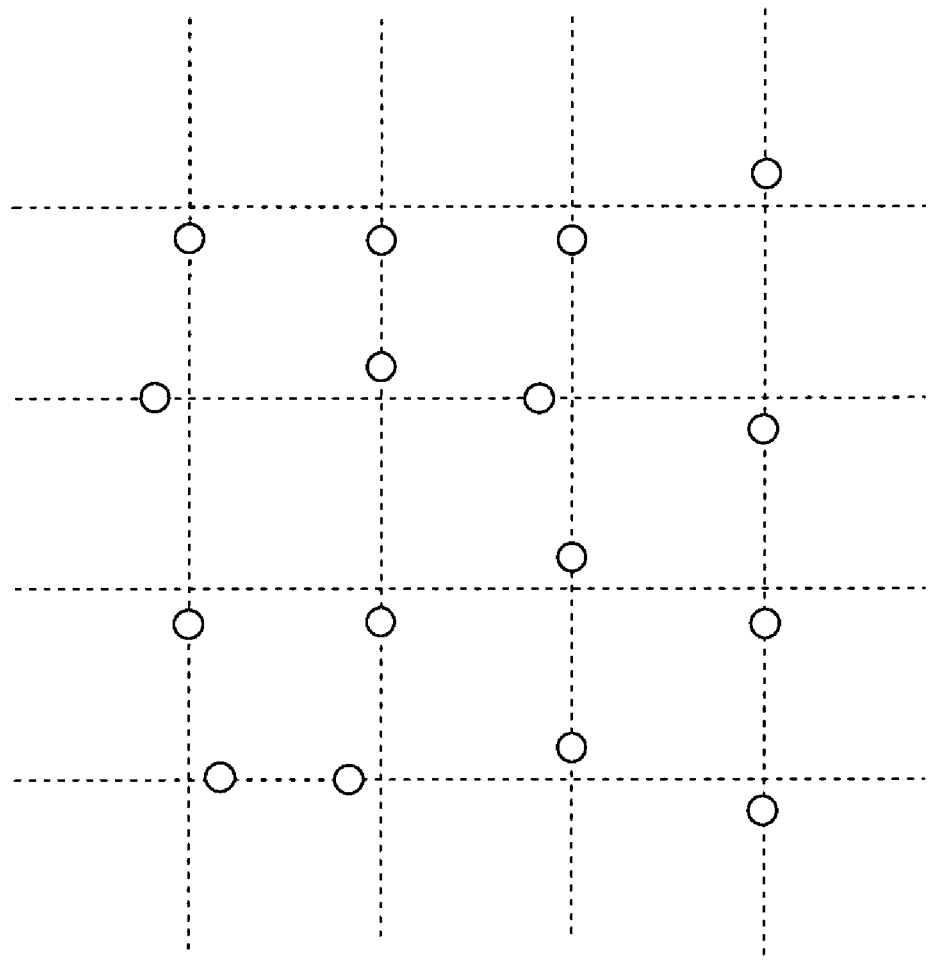
FIG. 6 is a schematic diagram of a code pattern in which 4*4 symbols are used for coding a position.

FIG. 6 shows an example of an image with 4×4 symbols which are read by a device for position determination.

These 4×4 symbols have the following values:

4 4 4 2
3 2 3 4
4 4 2 4
1 3 2 4

These values represent the following binary x- and y-code:

| x-code: | y-code: |
|---|---|
| 0 0 0 0 | 0 0 0 1 |
| 1 0 1 0 | 0 1 0 0 |
| 0 0 0 0 | 0 0 1 0 |
| 1 1 0 0 | 1 0 1 0 |

The vertical x-sequences code the following positions in the number series: 2 0 4 6. The differences between the columns will be −2 4 2, which modulo 7 gives: 5 4 2, which in mixed base codes position $(5-3)\times 8+(4-3)\times 2+(2-1)=16+2+1=19$. Since the first coded x-position is position 0, the difference which is in the range 1-2 and which is to be seen in the 4×4 symbols is the twentieth such difference. Since furthermore there are a total of three columns for each such difference and there is a starting column, the vertical sequence furthest to the right in the 4×4 x-code belongs to the 61st column in the x-code $(3\times 20+1=61)$ and the one furthest to the left belongs to the 58th.

The horizontal y-sequences code the positions 0 4 1 3 in the number series. Since these series begin in the 58th column, the starting position of the rows are these numbers minus 57 modulo7, which yields the starting position 6 3 0 2. Translated into digits in the mixed base, this will be 6-2, 3-2, 0-0, 2-2=4 1 0 0 where the third digit is the least significant digit in the number at issue. The fourth digit is then the most significant digit in the next number. In this case, it must be the same as in the number at issue. (An exceptional case is when the number at issue consists of the highest possible digits in all positions. Then one knows that the beginning of the next number is one greater than the beginning of the number at issue.)

The position of the four-digit number will then in the mixed base be $0\times 50+4\times 10+1\times 2+0\times 1=42$.

The third row in the y-code thus is the 43rd which has the starting position 0 or 1, and since there are four rows in all on each such row, the third row is number $43\times 4=172$.

Thus, in this example, the position of the uppermost left corner for the 4×4 symbol group is (58, 170).

Since the x-sequences in the 4×4 group begin on row 170, the x-columns of the entire pattern begin in the positions of the number series $((2\ 0\ 4\ 6)-169)$ modulo $7=1\ 6\ 3\ 5$. Between the last starting position (5) and the first starting position, the numbers 0-19 are coded in the mixed base, and by adding up the representations of the numbers 0-19 in the mixed base, one obtains the total difference between these columns. A naive algorithm to do so is to generate these twenty numbers and directly add up their digits. The resulting sum is called B. The sheet of paper or writing surface will then be given by (5-s)modulo7.

In the example above, an embodiment has been described, in which each position is coded with 4×4 symbols and a number series with 7 bits is used. Of course, this is but an example. Positions can be coded with a larger or smaller number of symbols. The number of symbols need not be the same in both directions. The number series can be of different length and need not be binary, but may be based on another base. Different number series can be used for coding in x-direction and coding in y-direction. The symbols can have different numbers of values. As is evident from the above, a coding with 6×6 symbols is presently preferred, each symbol being capable of assuming four values. A person skilled in the art can readily generalise the above examples to concern such coding.

In the example above, the marking is a dot but may, of course, have a different appearance. For example, it may consist of a dash or some other indication which begins in the virtual raster point and extends therefrom to a predetermined position. As one more alternative, the marking may consist of a rectangle, a square, a triangle or some other convenient, easily detected figure. The marking can be filled or open.

In the example above, the symbols within a square partial surface are used for coding a position. The partial surface may have a different form, such as hexagonal. The symbols need not be arranged in rows and columns at an angle of 90° to each other but can also be arranged at other angles, e.g. 60°, and/or in other arrangements. They could also code positions in polar coordinates or coordinates in other coordinate systems.

For the position code to be detected, the virtual raster must be determined. This can be carried out by studying the distance between different markings. The shortest distance between two markings must derive from two neighbouring symbols having the value 1 and 3 (horizontally) or 2 and 4 (vertically) so that the markings are located on the same raster line between two raster points. When such a pair of markings has been detected, the associated raster points can be determined with knowledge of the distance between the raster points and the displacement of the markings from the raster points. When two raster points have once been located, additional raster points can be determined by means of measured distances to other markings and with knowledge of the relative distance of the raster points.

The position-coding pattern described above can code a large number of unique positions and more specifically the absolute coordinates of these positions. All the positions or points that can be coded by means of the position-coding pattern can be said to jointly make up an imaginary surface. Different parts of the imaginary surface can be dedicated to different specific purposes. One area of the imaginary surface can, for instance, be dedicated to be used as a writing surface, another as a character recognition area and yet other areas as various activation icons. Other areas of the imaginary surface can be used in other applications. A corresponding subset of the position-coding pattern can then be used to create, for example, a certain activation icon which can be arranged in an optional location on a product. The coordinates coded by this subset of the position-coding pattern thus do not relate to a position on the product but to a position on the imaginary surface, which position is dedicated always to correspond to this activation icon.

In the presently preferred embodiment, the nominal interspace between the dots is 0.3 mm. Any part whatever of the position-coding pattern which contains 6×6 dots defines the absolute coordinates of a point on the imaginary surface. Each point on the imaginary surface is thus defined by a 1.8 mm×1.8 mm subset of the position-coding pattern. By determining the position of the 6×6 dots on a sensor in a device which is used to read the pattern, a position can be calculated by interpolation on the imaginary surface with a resolution of 0.03 mm. Since each point is coded with 6×6 dots which can each assume one of four values, $2^{72}$ points can be coded, which with the above-mentioned nominal interspace between the dots corresponds to a surface of 4.6 million $km^2$.

The absolute position-coding pattern can be printed an any paper whatever or other material which enables a resolution of about 600 dpi. The paper can have any size and shape whatever depending on the intended application. The pattern can be printed by standard offset printing. Ordinary black carbon-based ink or some other ink which absorbs IR light can advantageously be used. This means in fact that other inks, including black ink which is not carbon-based, can be used to superimpose other printed text on the absolute position-coding pattern, without interfering with the reading thereof.

A surface which is provided with the above-mentioned pattern printed with carbon-based black ink will be experienced by the human eye as only a slight grey shading of the surface (1-3% density), which is user-friendly and aesthetically pleasing.

Of course, a smaller or large number of dots than described above can be used to define a point on the imaginary surface and a larger or smaller distance between the dots can be used in the pattern. The examples above are only given to demonstrate a presently preferred implementation of the pattern.

The invention claimed is:

1. A handheld electronic device which is adapted to carry out at least one operation, comprising:
   a registration device for registering strokes when the device is moved;
   interpretation means for determining if the strokes comprise a command; and
   processor means for carrying out an operation associated with the command upon determination of said command,
   wherein the registration device is adapted to record the command electronically by detecting a position code arranged on a writing surface, upon which the command is written, and wherein the position code encodes position by directions of displacements of dots from raster points.

2. A device according to claim 1, wherein said registration device comprises an optical sensor, which is adapted to record images of the writing surface, and a signal processor, which is adapted to use the position code in the images for providing a digital representation of the command.

3. A device according to claim 2, wherein the signal processor comprises a character interpretation function which is adapted to translate the digital representation of the command into character-coded format.

4. A device according to claim 1, wherein, furthermore, the registration device is adapted to record a message information quantity, which is used in the operation, in essentially the same way as the command is recorded.

5. A device according to claim 4, wherein the device has at least two modes, one being a command mode for recording the command and the other being an information mode for recording the message information quantity.

6. A device according to claim 5, wherein the device is adapted to assume the command mode when the user writes said predetermined command using the device.

7. A device according to claim 5, wherein the device is adapted to assume the command mode when the device detects that the writing surface has a predetermined design.

8. A device according to claim 4, wherein the registration device is adapted to record the information quantity by detecting the position code on a writing surface.

9. A device according to claim 1, wherein the device has a first and second part which are separable and which have transceivers for mutual wireless communication, and wherein the device is controllable by the user using the first part as said pen, by means of which the command for initiating the operation is written.

10. A device according to claim 1, which device is a mobile telephone.

11. A device according to claim 1, which device is a digital pen for electronic recording of information.

12. A device according to claim 1, wherein only a detachable part of the device is used as a pen for writing the command for carrying out the operation, the detachable part being adapted for communication with the rest of the device.

13. The handheld electronic device of claim 1, wherein the position code codes each position by a plurality of marks and adjoining positions being partly coded by means of the same marks, and wherein the device further comprises decoding means for decoding said position code.

14. The handheld electronic device of claim 1, wherein the interpretation means are arranged to interpret the strokes as a command when the strokes are written on a part of the position code which codes predetermined positions.

15. The handheld electronic device of claim 1, wherein the interpretation means comprises character recognition means for translating the command to character-coded format.

16. The handheld electronic device of claim 1, wherein the command is a command to carry out an operation from the group of operations including dialing a telephone number, faxing, sending an electronic message, saving information, managing a document, managing a file, starting a program, controlling a program and closing a program.

17. The handheld electronic device of claim 1, wherein the command is written by alphanumerical characters.

18. A software program, which is stored on a memory medium, which can be read by a computer and which comprises instructions for causing the computer to detect a command, by electronically detecting a position code, written by means of a handheld electronic device, which is used as a pen, and to initiate a predetermined operation in response to the command, wherein the position code encodes position by directions of displacements of dots from raster points.

19. A method for initiating an operation in a handheld electronic device, comprising:
   using the device as a pen; and
   writing a command symbol to perform an operation corresponding to a command based on the command symbol on a surface that includes a position code, wherein the position code encodes position by directions of displacements of dots from raster points.

20. A method for controlling a handheld electronic device, the device being adapted to carry out at least one operation, comprising:
   registering strokes when the device is moved;
   determining if the strokes comprise a command; and
   carrying out an operation upon determination of the command, wherein the registering strokes includes recording the command electronically by detecting a position code arranged on a writing surface, upon which the command is written, wherein the position code encodes position by directions of displacements of dots from raster points.

21. A method according to claim 20, wherein registering strokes is performed using an optical sensor which records images of the writing surface, and wherein determining if the strokes comprise a command further includes processing, using the position code in the images, for providing a digital representation of the command.

22. A method according to claim 21, further comprising: translating the digital representation of the command into character-coded format.

23. A method according to claim 20, further comprising: registering a message information quantity.

24. A method according to claim 23, further comprising: registering the message information quantity by detecting a position code on a writing surface.

25. A method according to claim 24, wherein the device is adapted to assume the command mode when the user writes said predetermined command using the device.

26. A handheld electronic device which is adapted to carry out at least one operation, comprising:

a registration device for registering strokes when the device is moved;

an interpreter for determining if the strokes comprise a command; and a processor for carrying out an operation associated with the command upon determination of said command, wherein the registration device is adapted to record the command electronically by detecting a position code arranged on a writing surface, upon which the command is written, wherein the position code encodes position by directions of displacements of dots from raster points.

27. A handheld electronic device which is adapted to initiate at least one operation comprising:

a recording device for recording the movement pattern of the device over a writing surface when the device is used for writing on the writing surface, said recording device being adapted to record the movement pattern of the device electronically by detecting a position code on the writing surface, an interpretation module for detecting and interpreting a command formed and defined by at least a part of the recorded movement pattern, and a processor for initiating an operation corresponding to the command, wherein the position code encodes position by directions of displacements of dots from raster points.

28. The handheld electronic device of claim 27, wherein the interpretation means comprises character recognition means for translating the command to character-coded format.

29. The handheld electronic device of claim 27, wherein the position code codes each position by a plurality of marks and adjoining positions being partly coded by means of the same marks, and wherein the device further comprises decoding means for decoding said position code.

30. The handheld electronic device of claim 27, wherein the interpretation means are arranged to interpret the strokes as a command when the strokes are written on a part of the position code which codes predetermined positions.

31. The handheld electronic device of claim 27, wherein the command is a command to carry out an operation from the group of operations including dialing a telephone number, faxing, sending an electronic message, saving information, managing a document, managing a file, starting a program, controlling a program and closing a program.

32. The handheld electronic device according to claim 27, wherein said registration device comprises an optical sensor, which is adapted to record images of the writing surface, and a signal processor, which is adapted to use the position code in the images for providing a digital representation of the command.

33. The handheld electronic device of claim 27, wherein the command is written by alphanumerical characters.

34. The handheld electronic device according to claim 27, wherein the registration device is adapted to record a message information quantity, which is used in the operation, in essentially the same way as the command is recorded.

35. The handheld electronic device according to claim 34, wherein the registration device is adapted to record the information quantity by detecting the position code on a writing surface.

36. The handheld electronic device according to claim 34, wherein the device has at least two modes, one being a command mode for recording the command and the other being an information mode for recording the message information quantity.

* * * * *